United States Patent
Sandler et al.

(10) Patent No.: US 11,032,661 B2
(45) Date of Patent: *Jun. 8, 2021

(54) MUSIC COLLECTION NAVIGATION DEVICE AND METHOD

(71) Applicant: III HOLDINGS 1, LLC, Wilmington, DE (US)

(72) Inventors: Mark Brian Sandler, London (GB); Rebecca Lynne Stewart, London (GB)

(73) Assignee: III Holdings 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/937,152

(22) Filed: Jul. 23, 2020

(65) Prior Publication Data

US 2020/0359156 A1    Nov. 12, 2020

Related U.S. Application Data

(63) Continuation of application No. 16/405,983, filed on May 7, 2019, now Pat. No. 10,764,706, which is a
(Continued)

(30) Foreign Application Priority Data

Aug. 22, 2008    (GB) ...................................... 0815362

(51) Int. Cl.
*H04S 7/00*    (2006.01)
*G05B 15/02*    (2006.01)
(Continued)

(52) U.S. Cl.
CPC .............. *H04S 7/303* (2013.01); *G05B 15/02* (2013.01); *G06F 3/162* (2013.01); *G06F 3/167* (2013.01);
(Continued)

(58) Field of Classification Search
CPC . H04S 7/303; H04S 7/30; H04S 7/304; H04S 7/308; H04S 2400/11;
(Continued)

(56) References Cited

U.S. PATENT DOCUMENTS

| | | |
|---|---|---|
| 4,850,891 A | 7/1989 | Walkup et al. |
| 5,495,533 A | 2/1996 | Linehan et al. |

(Continued)

FOREIGN PATENT DOCUMENTS

WO    WO 1999015999    4/1999

OTHER PUBLICATIONS

Cohen, et al., "Multidiemsional Audio Windo Management" Int. J. Man-Machine Studies, vol. 34, No. 3, Mar. 1991 (Mar. 1991), pp. 319-336.
(Continued)

*Primary Examiner* — Fan S Tsang
*Assistant Examiner* — David Siegel
(74) *Attorney, Agent, or Firm* — Brinks Gilson & Lione

(57) ABSTRACT

An audio navigation device comprising an input means for inputting two or more audio pieces into the navigation device; a spatialization means for allocating a position in the form of a unique spatial coordinate to each audio piece and arranging the audio pieces in a multi-dimensional arrangement; a generating means for generating a binaural audio output for each audio piece, wherein the audio output simulates sounds that would be made by one or more physical sources located at the given position of each audio piece; an output means for simultaneously outputting multiple audio pieces as binaural audio output to a user; a navigation means for enabling a user to navigate around the audio outputs in the multi-dimensional arrangement; and a selection means for allowing a user to select a single audio output.

20 Claims, 9 Drawing Sheets

Related U.S. Application Data continuation of application No. 15/135,284, filed on Apr. 21, 2016, now Pat. No. 10,334,385, which is a continuation of application No. 14/719,775, filed on May 22, 2015, now Pat. No. 9,363,619, which is a continuation of application No. 13/060,090, filed as application No. PCT/GB2009/002042 on Aug. 20, 2009, now Pat. No. 9,043,005.

(51) Int. Cl.
*G06F 16/64* (2019.01)
*G06F 3/16* (2006.01)

(52) U.S. Cl.
CPC ............... *G06F 16/64* (2019.01); *H04S 7/30* (2013.01); *H04S 7/304* (2013.01); *H04S 7/308* (2013.01); *H04S 2400/11* (2013.01); *H04S 2420/01* (2013.01); *H04S 2420/11* (2013.01)

(58) Field of Classification Search
CPC .. H04S 2420/01; H04S 2420/11; G06F 16/64; G06F 3/162; G06F 3/165; G06F 3/167; G05B 15/02
See application file for complete search history.

(56) References Cited

U.S. PATENT DOCUMENTS

| | | |
|---|---|---|
| 5,732,077 A | 3/1998 | Whitehead |
| 5,801,985 A | 9/1998 | Roohparvar et al. |
| 5,930,167 A | 7/1999 | Lee et al. |
| 6,021,206 A | 2/2000 | McGrath |
| 7,035,854 B2 | 4/2006 | Hsiao et al. |
| 7,127,633 B1 | 10/2006 | Olson et al. |
| 7,243,351 B2 | 7/2007 | Kundu |
| 7,433,479 B2 | 10/2008 | Sato |
| 7,568,199 B2 | 7/2009 | Bozak et al. |
| 8,196,133 B2 | 6/2012 | Kakumani et al. |
| 9,043,005 B2 | 5/2015 | Sandler et al. |
| 9,363,619 B2 | 6/2016 | Sandler et al. |
| 10,334,385 B2 | 6/2019 | Sandler et al. |
| 10,764,706 B2 | 9/2020 | Sandler et al. |
| 2002/0059094 A1 | 5/2002 | Hosea et al. |
| 2003/0126013 A1 | 7/2003 | Shand |
| 2003/0154112 A1 | 8/2003 | Neimanet et al. |
| 2003/0172174 A1* | 9/2003 | Mihalcheon .......... G06F 16/954 709/231 |
| 2004/0015973 A1 | 1/2004 | Skovira |
| 2006/0045275 A1 | 3/2006 | Daniel |
| 2006/0048157 A1 | 3/2006 | Dawson et al. |
| 2006/0251263 A1 | 11/2006 | Vronay |
| 2008/0228299 A1* | 9/2008 | Ikeda ................... G11B 27/105 700/94 |
| 2009/0116652 A1* | 5/2009 | Kirkeby ................. H04S 7/303 381/1 |
| 2009/0185693 A1* | 7/2009 | Johnston ................ H04S 3/002 381/17 |
| 2009/0282335 A1* | 11/2009 | Alexandersson ......... H04S 7/30 715/716 |
| 2011/0179134 A1 | 7/2011 | Mayo et al. |

OTHER PUBLICATIONS

Lee, et al., "A Personalized Preset-based Audio System for Interactive Service", Oct. 5, 2006, Audio Engineering Society Convention Paper, New York, NY, US pp. 1-6.

International Search Report for International Application No. PCT/GB2009/002042 dated Dec. 7, 2009, 3 pages.

European Office Action dated Aug. 11, 2011 for EP Application Serial No. 09784979.8, 5 pages.

European Office Action dated Aug. 3, 2012 for EP Application Serial No. 09784979.8, 5 pages.

Non-Final Office Action received for U.S. Appl. No. 13/060,090 dated Apr. 11, 2013, 29 pages.

Non-Final Office Action received for U.S. Appl. No. 13/060,090 dated Jul. 17, 2014, 40 pages.

Notice of Allowance received for U.S. Appl. No. 13/060,090 dated Jan. 21, 2015, 26 pages.

Non-Final Office Action received for U.S. Appl. No. 15/135,284 dated Apr. 7, 2017, 32 Pages.

Final Office Action received for U.S. Appl. No. 15/135,284 dated Oct. 19, 2017, 26 Pages.

Non-Final Office Action dated Jun. 14, 2018 for U.S. Appl. No. 15/135,284 dated Jun. 14, 2018, 38 Pages.

Notice of Allowance received for U.S. Appl. No. 15/135,284 dated Feb. 7, 2019, 21 pages.

Final Office Action received for U.S. Appl. No. 13/060,090 dated Jan. 29, 2014, 26 pages.

Non-Final Office Action received for U.S. Appl. No. 16/405,983 dated Jan. 21, 2020, 38 Pages.

Caesar et al., "Design and Implementation of a Routing Control Platform," Usenix, NSDI '05 Paper, Technical Program, obtained from the Internet, on Apr. 13, 2021, at URL <https://www.usenix.org/legacy/event/nsdi05/tech/full_papers/caesar/caesar.html/>, 23 pages.

\* cited by examiner

Appendix 1 (cont'd.)

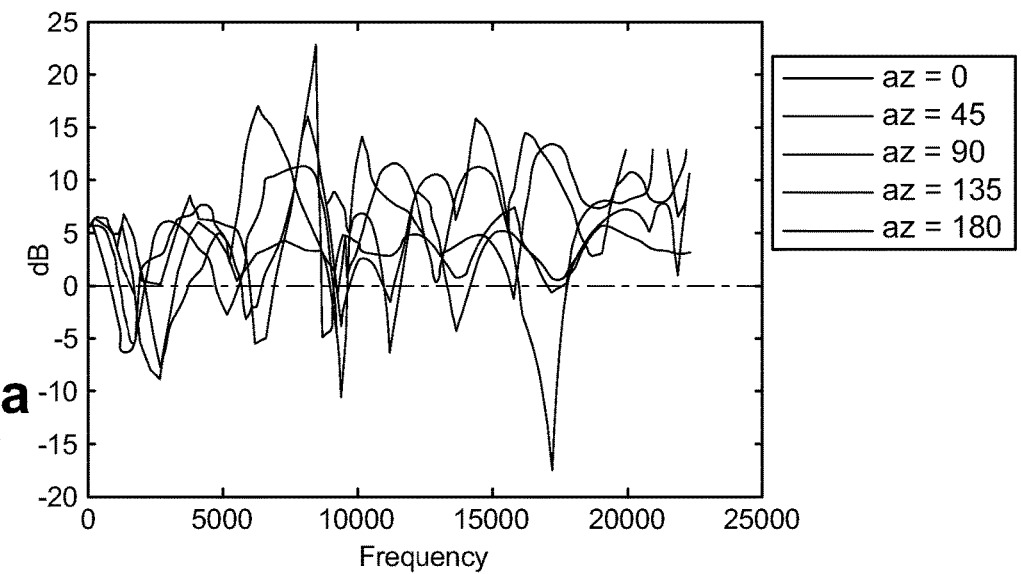
Fig. 8a First Order
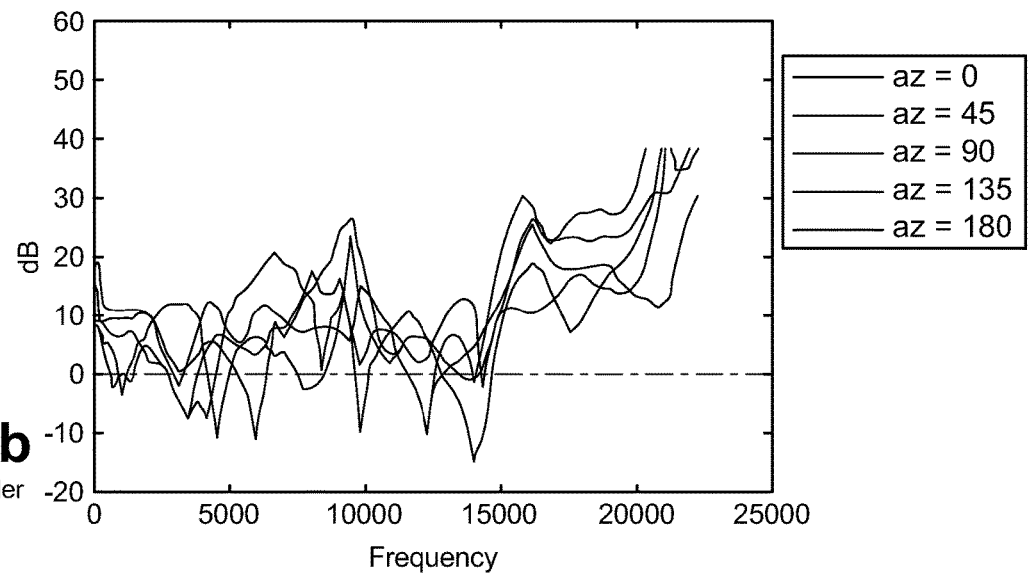
Fig. 8b Second Order
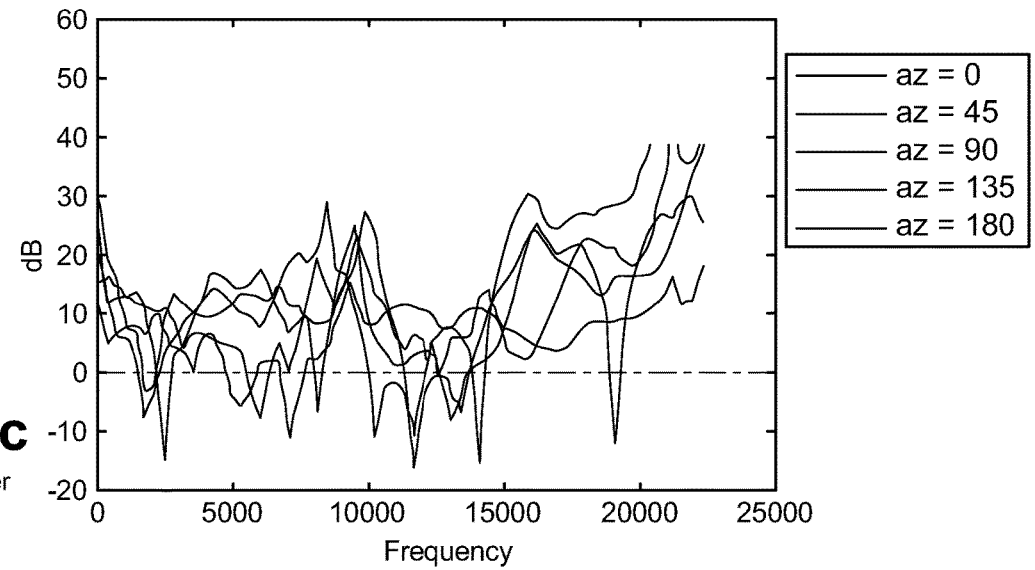
Fig. 8c Third Order First Order Second Order Third Order

MUSIC COLLECTION NAVIGATION DEVICE AND METHOD

RELATED APPLICATIONS

The application is a continuation of, and claims priority to each of, U.S. patent application Ser. No. 16/405,983, filed May 7, 2019, and entitled "MUSIC COLLECTION NAVIGATION DEVICE AND METHOD," which is a continuation of U.S. patent application Ser. No. 15/135,284 (now U.S. Pat. No. 10,334,385), filed Apr. 21, 2016, and entitled "MUSIC COLLECTION NAVIGATION DEVICE AND METHOD," which is a continuation of U.S. patent application Ser. No. 14/719,775 (now U.S. Pat. No. 9,363,619), filed May 22, 2015, and entitled "MUSIC COLLECTION NAVIGATION DEVICE AND METHOD," which is a continuation of U.S. patent application Ser. No. 13/060,090 (now U.S. Pat. No. 9,043,005), filed May 12, 2011, and entitled "MUSIC COLLECTION NAVIGATION DEVICE AND METHOD," which is a national stage of PCT International Application No. PCT/GB2009/002042, filed on Aug. 20, 2009, published on Feb. 25, 2010 as WO 2010/020788, and entitled "MUSIC COLLECTION NAVIGATION DEVICE AND METHOD," each of which applications claims further priority to GB Application No. 0815362.9, filed Aug. 22, 2008. The foregoing applications are hereby incorporated by reference herein in their respective entireties.

TECHNICAL FIELD

The present application relates generally to a music collection navigation device and method and more specifically a spatial audio interface, which allows a user to explore a music collection arranged in a two or three dimensional space.

BACKGROUND

The most common interface for accessing a music collection is a text-based list. Music collection navigation is used in personal music systems and also in online music stores. For example, the iTunes digital music collection allows a user to search for an explicitly chosen song name, album name or artist name. A list of potential matches is returned, usually in the form of a list and often ranked in terms of relevance. This requires a user to know in advance the details of the music they are looking for, which inhibits a user from discovering new music. The user is often given a list of several thousand songs from which to choose and, because a user is only able to listen to a single song at any one time, they need to invest a significant amount of time to listen to, and browse through, the choices offered, to make a decision about to which song to listen.

Previous audio interfaces have focused on spatializing the sounds sources and approaches to overcome errors introduced in this presentation of the sounds. In known interfaces, sound sources are presented in a virtual position in front of the listener to aid localization and decrease problems introduced in interpolating the head-related transfer functions. The AudioStreamer interface developed in the 1990s presented a user with three simultaneously playing sounds sources, primarily recording of news radio programs. The sounds were spatially panned to static locations directly in front and at sixty degrees to either side of the listener. The virtual position of the sound sources was calculated using head-related transfer functions (HRTFs). Sensors positioned around the listener allowed the sound source preferred by a user to be tracked without any further user input.

Several audio-only interfaces have also been developed to assist a user in re-mixing multiple tracks of the same song, such as the Music Scope headphones interface developed by Hamanaka and Lee. Sensors on the headphones were used to track a user's movement but the invention failed to ensure the accurate spatialization of the sounds because it is concerned with re-mixing rather than navigating through multiple songs. Without accurate spatialization of the sounds sources, a listener is likely to be confused and any selection of sounds source by the user is difficult and so inaccurate. These existing interfaces do not allow a user to directly interact with the sound sources to select which option to play. By using fixed sounds sources, such interfaces are unsuitable for exploring a large music collection.

It is also known to create a combined visual and audio interface wherein music is spatialized for a loudspeaker setup, such as the Islands of Music interface developed by Knees et al. However, such a system would not be suitable for headphone listening and so cannot be applied, for example, to a personal music system or to mobile phone applications.

The majority of existing audio interfaces for interaction with audio files use non-individualized HRTFs to spatialize the sound source and are concerned with overcoming errors common to such methods. The interfaces presented to a user are limited to a front position with respect to a user to aid localization. The systems are kept static to decrease computational load. None of the known interfaces disclose an accurate method for presenting the spatial audio with which a user is allowed to interact. The placement of the sounds in the virtual environment is key factor in allowing a user to interact with multiple sources simultaneously.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIGS. 8A, 8B, and 8C show graphs illustrating the error in dB over frequency for the contralateral ear;

DETAILED DESCRIPTION

Figure 1:
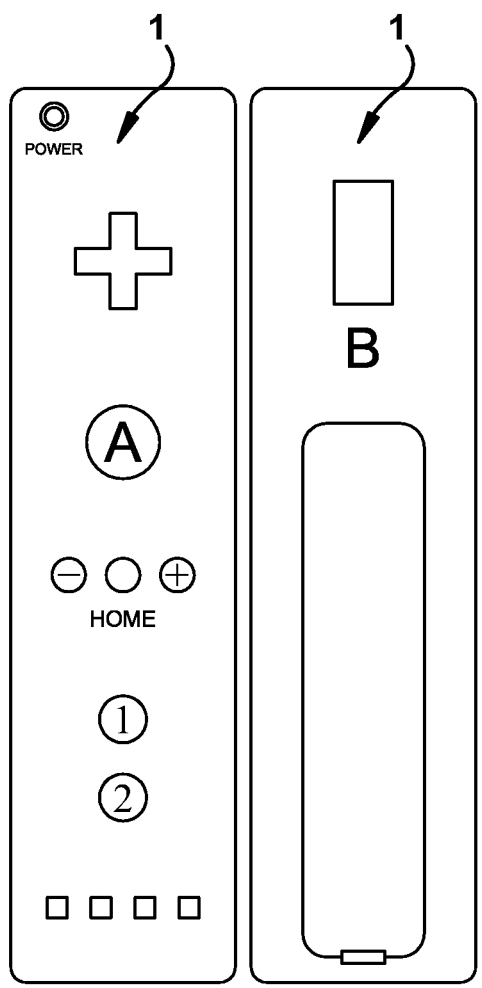
FIG. 1 is a plan view of a remote controller constructed in accordance with the present application.

The present application sets out to provide an improved method and apparatus for music collection navigation, which alleviates the problems described above by providing a method and apparatus which allows a user to make a quicker a more informed decision about which piece of music to which to listen.

Accordingly, in a first aspect the present embodiments provide an audio navigation device comprising:
  an input means for inputting two or more audio pieces into the navigation device;
  a spatialization means for allocating a position in the form of a unique spatial coordinate to each audio piece and arranging the audio pieces in a multi-dimensional arrangement;
  a generating means for generating a binaural audio output for each audio piece, wherein the audio output simulates sounds that would be made by one or more physical sources located at the given position of each audio piece;
  an output means for simultaneously outputting multiple audio pieces as binaural audio output to a user;
  a navigation means for enabling a user to navigate around the audio outputs in the multi-dimensional arrangement;
  a selection means for allowing a user to select a single audio output.

Within the context of this specification the word "comprises" is taken to mean "includes, among other things". It is not intended to be construed as "consists of only". The term "spatialization" is understood to refer to localization or placement of sounds in a virtual space, which creates an illusion whereby the origin of the sound appears to be located in a specific physical position.

By presenting audio pieces or songs in a two or three dimensional space around a user's head, a user is able to judge several pieces simultaneously without the need for the user to know in advance the piece or song that they are searching for. The present embodiments can also scale to use with large music collections and does not rely on visual feedback or require a user to read textual metadata, such as artist and album. This makes the present embodiments beneficial to users who cannot see, but also allows those that can see to perform the audio searching task in addition to other tasks requiring sight. A user is able to better interact with the songs and have more flexible playback options when choosing which song to play. The present embodiments provide a quicker, more accurate and more direct display of the music without the need to rely on a text based list.

Preferably, the generating means generates a binaural audio output using Ambisonics encoding and decoding.

More preferably, the generating means generates a binaural audio output using first order Ambisonics encoding and decoding.

By using Ambisonics encoding and decoding a constant number of HRTFs are required independent of the number of sound sources, which are convolved without any need for interpolation. This reduces the computational complexity of the present embodiments, which is particularly pertinent when the present embodiments are used to navigate through large music collections. That is, the only limits on the number of sounds sources that are simultaneously played around a listener are psychoacoustical rather than any limitations imposed by the use of HRTFs. First order Ambisonics was surprisingly shown to be the most accurate method for synthesizing a binaural output. First order Ambisonics also reduces the computational load.

Preferably, the generating means generates a binaural audio output wherein the audio output simulates sounds that would be generated by multiple sources.

Preferably, the input means is adapted to automatically input audio pieces according to a preference input by the user.

The present embodiments can adapt the audio output for a user depending on a user's likes and dislikes. For example a "seed song", which the user typically likes, can be used to generate a list of songs for a user to navigate through. This method is much quicker than conventional keyword searching, where a user has to open each recommended audio piece individually to narrow their selection.

Preferably, the output means comprise a pair of headphones.

By using headphones, the present embodiments can be used with personal music players and other mobile devices such as mobile phones.

Optionally, the output means comprise a pair of loudspeakers.

By using loudspeakers, the present embodiments can be used in a recording studio in professional audio navigation applications. It is to be understood that, in an alternative embodiment of the present application, the generating means generates an audio output, which is suitable for loudspeakers and is not binaural. Multiple loudspeakers are used as an output means for simultaneously outputting multiple audio pieces.

Preferably, the navigation means comprises a remote controller, such as a keyboard, a joystick, a touch screen device, one or more accelerometers, or video motion tracking.

More preferably, the navigation means is adapted to include a zoom function.

A zoom function allows a user to easily select the number of audio pieces that are output at any one time and reach a comfortable level according to personal preference.

Preferably, the spatialization means is adapted to arrange each audio output according to its content.

The user can choose to be presented with audio output that is similar in content, for example the output can be grouped according to the emotional content of the audio pieces. This can be done according to tags associated with each audio piece.

Optionally, the navigation device further comprises a play list generator or a mapping means for storing predetermined similarity maps.

Mapping audio pieces according to similarity can encourage a user to listen to new music and can also make navigation through a large music collection easier and more efficient.

Preferably, the output means is adapted to play about four audio pieces simultaneously.

It has been found that four audio pieces allows for efficient presentation of the audio pieces without causing confusion to a user.

Preferably, the spatialization means arranges each audio output in a two dimensional space.

Optionally, the spatialization means arranges each audio output in a three dimensional space.

Preferably, the spatialization means arranges each audio output in an "on-axis" configuration wherein the audio output simulates sounds that would be made by physical sources located directly in front and directly behind a user's head.

Preferably, the spatialization means arranges each audio output in an on-axis configuration at ninety degree intervals.

An "on-axis configuration" is understood to mean that the virtual loudspeakers are located directly to the front and back of the listener's head. For first order decoding further speakers are located directly to the left and the right of a user's head. An on-axis configuration has been shown to be the best configuration for binaural audio output.

Optionally, the spatialization means arranges each audio output in an on-axis configuration at sixty degree intervals.

Optionally, the spatialization means arranges each audio output in an on-axis configuration at 22.5 degree intervals.

Preferably, each audio piece is any one or more of a song, an audio stream, speech or a sound effect.

Optionally, the music navigation device further comprises a visual display means.

In a second aspect, the present embodiments provide a music navigation method comprising the following steps:
 inputting two or more audio pieces into the navigation device;
 allocating a position in the form of a unique spatial coordinate to each audio piece;
 arranging the audio piece in a multi-dimensional arrangement;
 generating a binaural audio output for each audio piece, wherein the audio output simulates sounds that would be made by one or more physical sources located at the given position of each audio piece;
 simultaneously outputting multiple audio pieces as binaural audio output to a user;
 navigating around the audio outputs in the multi-dimensional arrangement; and
 selecting a single audio output.

For the purposes of clarity and a concise description, features are described herein as part of the same or separate embodiments; however it will be appreciated that the scope of the various embodiments may include ones having combinations of all or some of the features described.

Figure 5A:
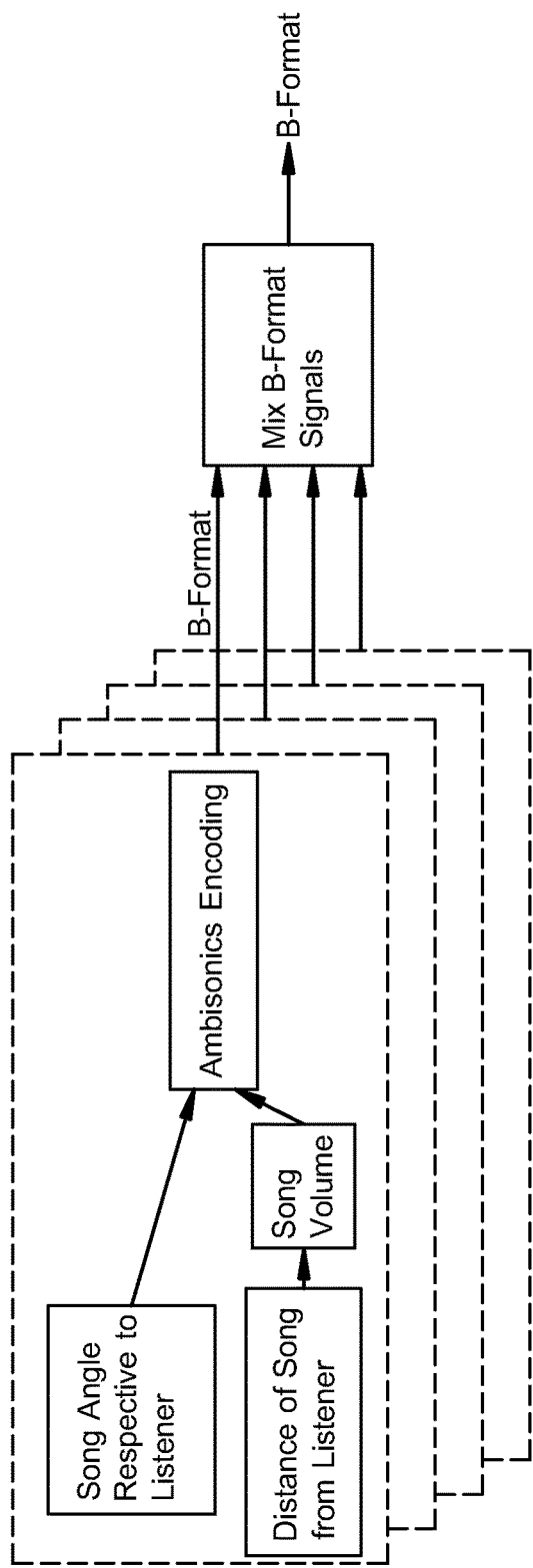
FIGS. 5A and 5B are flow diagrams illustrating the Ambisonics encoding and decoding according to the present application.
Figure 5B:
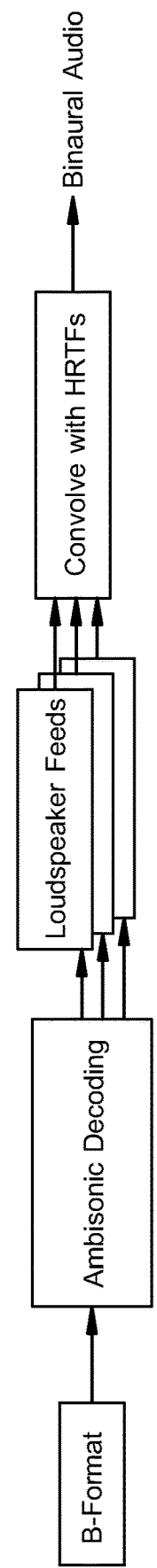

The present embodiments can use virtual Ambisonics to convert an Ambisonics B-format sound field into a binaural signal to be output through the headphones to a user. As shown in FIGS. 5A and 5B, the system encodes the sound sources into Ambisonics B-format and then decodes the B-format into speaker signals before convolving with head related transfer functions (HRTFs) to render signals for playback over headphones. First order Ambisonics has been found advantageous for this method and lower order encoding and decoding can be used to decrease the computational load. First order decoding has been shown to provide sufficient spatialization accuracy for the purposes of the present embodiments. However, any order of Ambisonics can be used. The herein description of the embodiments refers to first to third order Ambisonics but any order can be used by applying the appropriate algorithms Using the method of the present embodiments, a constant number of HRTFs are used independent of the number of sound sources convolved and does not depend on interpolation or a dense measurement set. The sound field is encoded in B-format, which simplifies the calculations to rotate the sound field, as would occur if the listener turned their head.

The collection of music is arranged according to any suitable algorithm for assigning unique spatial coordinates to each song in a collection. Thus, each song is arranged in a virtual space according to the songs perceived distance from the user and also the angle of the song in relation to the user. The coordinates can be assigned in many ways. For example, the songs can be arranged according to properties of the songs or randomly.

The coordinates can be points on a circle or a sphere or any two or three dimensional object with the virtual acoustic space. The sounds sources presented are not limited to music but can be any audio stream, such as speech or sound effects.

A hand-held remote controller 1 is provided to navigate through the songs and allows a user to select a song to listen to in full stereo. As shown in FIG. 1, the controller 1 allows a user to switch between collections. Button A allows a user to select the song he wishes to listen to in full and button B is depressed to change the type of songs, i.e., the collection, which is arranged around the user's head. It is envisaged that the present embodiments can be used in conjunction with any play list generator or similarity map to allow the song collection to be arranged around a user according to a user's tastes. For example, the songs presented to the user can be selected from a "seed" song, which a user typically likes. The remote controller shown comprises three accelerometers, seven buttons and four further buttons arranged in a cross formation, four LEDs. The remote controller is able to vibrate.

Figure 2:
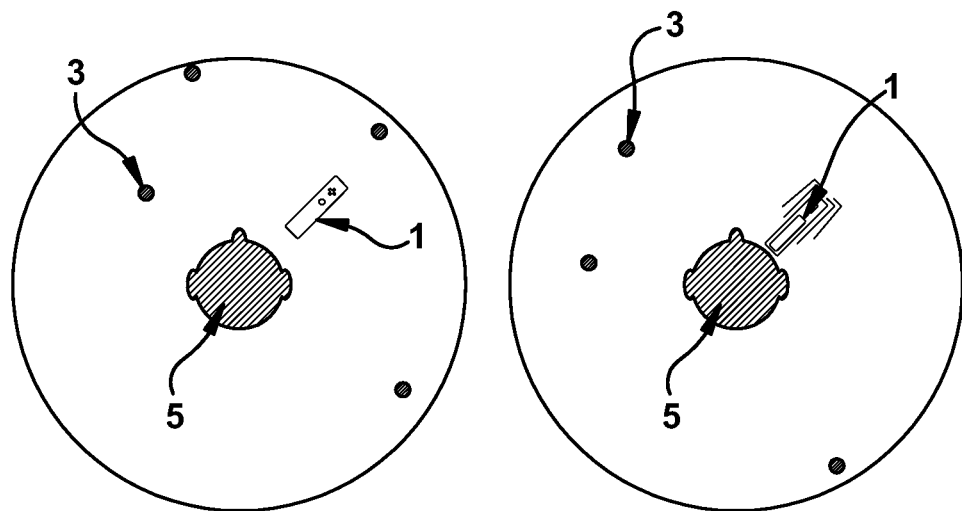
FIG. 2 is a schematic view of the spatialization and selection steps of the method of the present application.

As shown in FIG. 2, in use, a user 5 points the remote controller 1 towards the song positioned in virtual space that he wishes to select and moves the controller towards the song he is interested in. The user can choose to interpret the interface from one of two equivalent viewpoints. If the user perceives himself to be static and the songs to be moving around him then they point the remote controller at the song to bring the song towards them. If a user perceives himself to be mobile and moving around between the songs, with the songs in a fixed position, then they point the controller in the direction in which they would like to move. From either viewpoint the user is able to resolve any front-back confusion and other localization problems by moving in the environment and adjusting accordingly.

Figure 3:
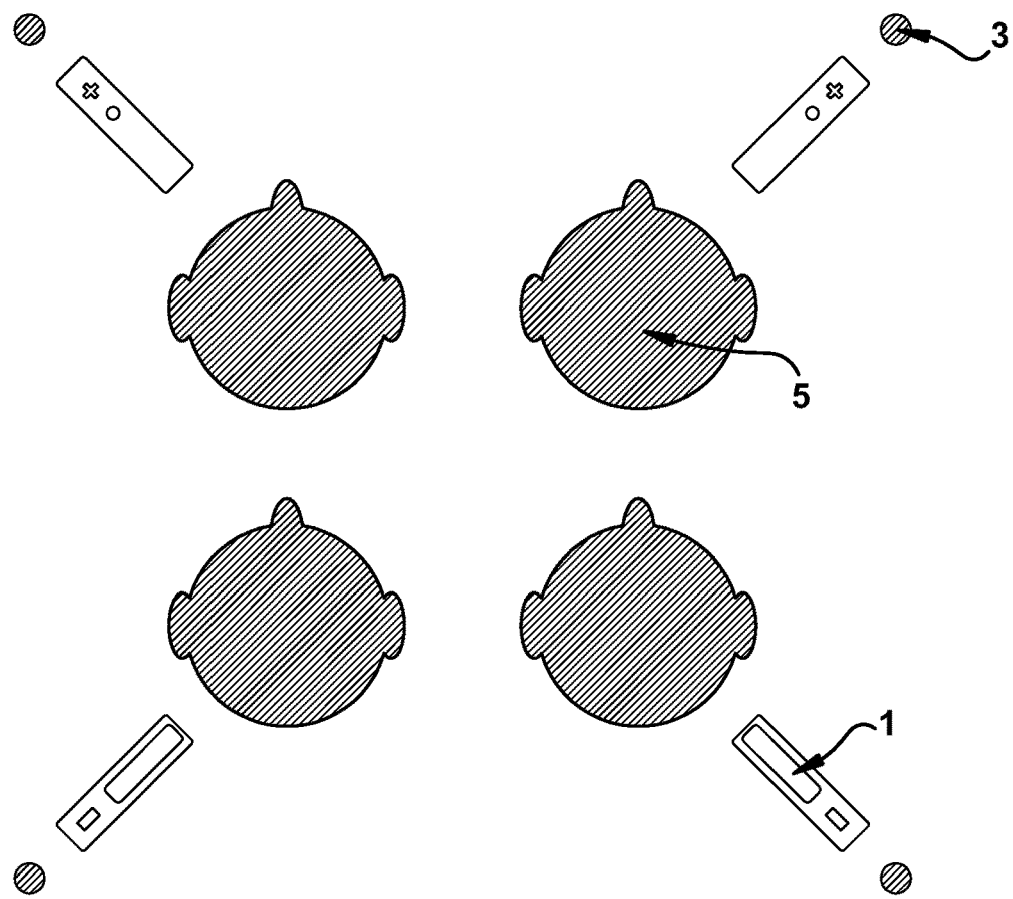
FIG. 3 is a schematic view to show how the remote controller is used to select songs in front and behind a user in accordance with the present application.

The accelerometers within the remote controller 1 use Bluetooth to communicate with the processing unit/computer. There is no absolute direction in which the remote controller 1 needs to be pointed. The user can be facing towards or away from the computer and it has no effect on the direction of movement within the interface. The position of the remote controller 1 is controlled with respect to the headphones. The data from the accelerometers is processed to extract the general direction that the remote controller 1 is pointing in three dimensions. The user depresses button B to indicate when movement is intentional and moves with constant velocity in the desired direction. As shown in FIG. 3, a user 5 is able to access songs 3 in front of him when the remote controller 1 is facing upwards, that is with the A button uppermost. To access songs behind him, he can reach over his shoulder with the remote controller 1, such that the controller 1 is facing downwards, with the A button lowermost. The remote controller 1 vibrates when the user is close enough to the song to select the song using button A. The user then depresses button A to listen to the song in stereo. When a user has finished listening to the song, they can depress button A again to return to the two/three dimensional spatial arrangement of songs. They will again hear multiple songs playing simultaneously and continuously around their head and use the remote controller 1 to navigate around the space before selecting another song, as described above.

When a song is selected, it can also be used for further processing, such as automatically generating a recommended play list or purchasing the song from an online music store.

Figure 4:
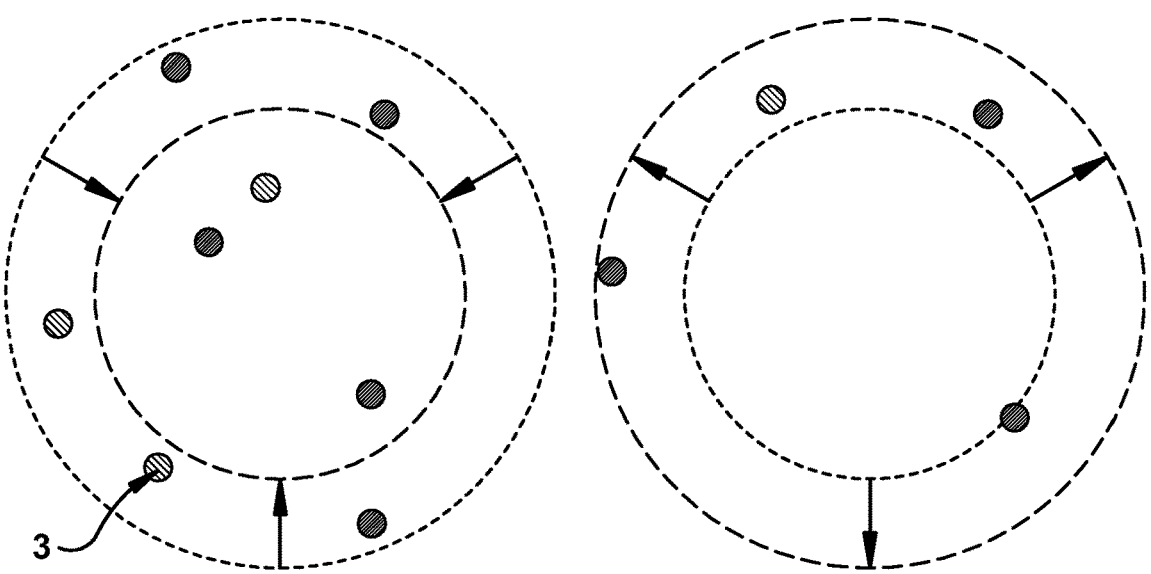
FIG. 4 is an illustration of how the zoom function of the remote controller of the present application can be used to navigate through dense or sparse data.

As shown in FIG. 4, when navigating through the audio space, the user is also able to use the remote controller 1 to zoom in and out to hear more songs or fewer songs. This allows a user to balance the number of songs 3 to which he listens. If the data is too clustered around a user so that a large number of songs are playing at once, then the user can zoom out and listen to fewer songs. If the data is too sparse and the user feels lost because he cannot find a song to which to listen, then he can zoom in and increase the number of songs playing at that time. The zoom function increases or decreases the listening area. As shown in FIG. 4, if the songs are arrange in a circle surrounding the user, when the user presses the [+] button to zoom in the radius of the circle shrinks allowing only the closest songs to be heard. When the user presses the [−] button the radius of the circle increases allowing more songs to be heard.

It is possible for an alternative controller to be used with the present embodiments and for alternative functions to be provided. The arrow keys of a conventional keyboard, a joystick or the touch screen functions of an iPhone can be used to control the apparatus. For example, a further function can allow a user can select the type of listening environment in which the sound sources should be played, such as a living room or a cathedral. Although not described in the above-referenced example, it is also envisaged that a visual display could be provided. Although the system is primarily audio based if the user wished to learn further details about the songs that are selected then a visual display or a text-to speech function could be used to provide the required information.

Spatial Audio

The present embodiments can use virtual Ambisonics to convert an Ambisonics B-format sound field into a binaural signal to be output through the headphones to a user. As shown in Figures 5a and 5b, the system encodes the sound sources into Ambisonics B-format and then decodes the B-format into speaker signals before convolving with head related transfer functions (HRTFs) to render signals for playback over headphones. First order Ambisonics has been found advantageous for this method and lower order encoding and decoding can be used to decrease the computational load. First order decoding has been shown to provide sufficient spatialization accuracy for the purposes of the present embodiments. However, any order of Ambisonics can be used. The herein description of the embodiments refers to first to third order Ambisonics but any order can be used by applying the appropriate algorithms Using the method of the present embodiments, a constant number of HRTFs are used independent of the number of sound sources convolved and does not depend on interpolation or a dense measurement set. The sound field is encoded in B-format, which simplifies the calculations to rotate the sound field, as would occur if the listener turned their head.

The HRTFs of the present embodiments are used to filter the audio signals to simulate the sounds that would be made by a physical source located at a given position with respect to a listener. This is distinctly different from traditional stereo headphone listening where the sounds appear to be originating between a listener's ears, inside their head. However, the HRTFs are only approximations of a user's personal HRTFs and it is understood that errors can occur.

For example, a sound source can appear as if it is located behind the listener when it should appear to be located in front of the listener. The present embodiments overcomes these errors by enabling a user to manually change the sound field, simulating moving their head.

Ambisonics is applied to the present embodiments to optimize the binaural rendering of sounds over headphones. The method considers the listener's head to be kept in an ideal spot and allows the "virtual loudspeakers" to be moved around the listener and be placed anywhere. The method uses horizontal-only Ambisonics. We can assume that no vertical information needs to be considered because the elevation of any source will always be equal to zero. However, it is to be understood that the method could also be extended to include height information. The examples given below refer to first to third order Ambisonics. However, the method could be extended to higher orders.

The method of the present embodiments requires at least three B-format channels of audio as an input signal, which are mixed down to output two channels. The HRTF pair is found for each B-format channel. Thus, at first order, three pairs of HRTFs (six filters) are required for any loudspeaker arrangement. Equations 1 show how the HRTF for each B-format channel is computed from the chosen virtual loudspeaker layout. Equations 1 is derived from the Furse-Malham coefficients for horizontal-only Ambisonics:

$$W^{hrtf} = 1 / \sqrt{2x \sum_{k=1}^{N} \left( S\frac{hrtf}{k} \right)}$$

$$W^{hrtf} = \sum_{k=1}^{N} \left( \cos(\theta_k) x S_k^{hrtf} \right)$$

$$Y^{hrtf} = \sum_{k=1}^{N} \left( \sin(\theta_k) x S_k^{hrtf} \right)$$

Equation 1

N is the number of virtual loudspeakers each with a corresponding azimuth θ and HRTF, $S^{hrtf}$ Equation 2 describes how the signals for each ear are then calculated:

$$\text{Left} = (W \otimes W_L^{hrtf}) + (X \otimes X_L^{hrtf}) + (Y \otimes Y_L^{hrtf})$$

$$\text{Right} = (W \otimes W_R^{hrtf}) + (X \otimes X_R^{hrtf}) + (Y \otimes Y_R^{hrtf})$$

Equation 2

It has been found that for the best results and the optimum decoding, Ambisonics should be decoded to regular loudspeaker distributions. The virtual loudspeakers are distributed about the listener so that the left and rights sides are symmetric. The left and right HRTFs of the omni-directional channel W are the same as are the left and right HRTFs of the X channel, which captures front and back information. The left and right HRTFs are equal but phase inverted. Thus, only three individual HRTFs, not pairs of HRTFs, are needed for a horizontal binaural rendering, as shown in Equation 3:

$$\text{Left} = (W \otimes W^{hrtf}) + (X \otimes X^{hrtf}) + (Y \otimes Y^{hrtf})$$

$$\text{Right} = (W \otimes W^{hrtf}) + (X \otimes X^{hrtf}) - (Y \otimes Y^{hrtf})$$

Equation 3

As shown, first order horizontal-only Ambisonic decoding can be accomplished with only six convolutions with three HRTFs.

The same optimizations can be applied to second and third order horizontal-only decoding. Second order requires the additional channels U and V, and third order uses P and Q. The HRTF pair for each channel can be computed as illustrated above for the first order using the appropriate Ambisonics coefficients as seen in Equation 4:

$$U^{hrtf} = \sum_{k=1}^{N} \left(\cos(2\theta_k) x S_k^{hrtf}\right)$$

$$V^{hrtf} = \sum_{k=1}^{N} \left(\sin(2\theta_k) x S_k^{hrtf}\right)$$

$$P^{hrtf} = \sum_{k=1}^{N} \left(\cos(3\theta_k) x S_k^{hrtf}\right)$$

$$Q^{hrtf} = \sum_{k=1}^{N} \left(\sin(3\theta_k) x S_k^{hrtf}\right)$$

Equation 4

The channels U and P share the same symmetries as the X channel; they are symmetrical and in phase. V and Q are similar to Y as they are phase inverted. These symmetries are taken account in the second order calculations for calculating the signals for each ear, shown below in Equation 5:

Left=$(W \otimes W^{hrtf})+(X \otimes X^{hrtf})+(Y \otimes Y^{hrtf})+(U \otimes U^{hrtf})+$
$(V \otimes V^{hrtf})+(P \otimes P^{hrtf})+(Q \otimes Q^{hrtf})$ Right=$(W \otimes W^{hrtf})+(X \otimes X^{hrtf})-(Y \otimes Y^{hrtf})-(U \otimes U^{hrtf})-$
$(V \otimes V^{hrtf})+(P \otimes P^{hrtf})-(Q \otimes Q^{hrtf})$ Equation 5

Thus, second order horizontal-only Ambisonics decoding can be accomplished with ten convolutions with five HRTFs and third order can be accomplished with fourteen convolutions with seven HRTFs.

The present embodiment applies the optimum parameters for the most efficient and psychoacoustically convincing binaural rendering of Ambisonics B-format signal. The effects of the virtual loudspeaker placement have also been considered and the following criteria have been applied:
 i. Regular distribution of loudspeakers
 ii. Maintenance of symmetry to the left and right of the listener
 iii. Use of the minimum number of loudspeakers required for the Ambisonics order.

The third criterion avoids comb-filtering effects from combining multiple correlated signals. The relationships between the number of loudspeakers N and the order of the system M is as set out below in equation 6:

$N \geq 2M+2$  Equation 6

Thus, the present embodiments can use an "on-axis" configuration of virtual sounds sources. The virtual loudspeakers are located directly to the right, left, front and back of the listener.

The above described embodiment has been given by way of example only, and the skilled reader will naturally appreciate that many variations could be made thereto without departing from the scope of the claims.

Testing for Effect of Virtual Loudspeaker Placement and Decoding Order

The present embodiments are based on considerations of the ideal placement of the virtual loudspeakers and the ideal decoding order. Virtual Ambisonics refers to the binaural decoding of a B-format signal by convolving virtual loudspeaker feeds with HRTFs to create a binaural signal. The testing conducted in development of the present embodiments has been carried out to understand the best practice to render a binaural signal.

Figure 6:
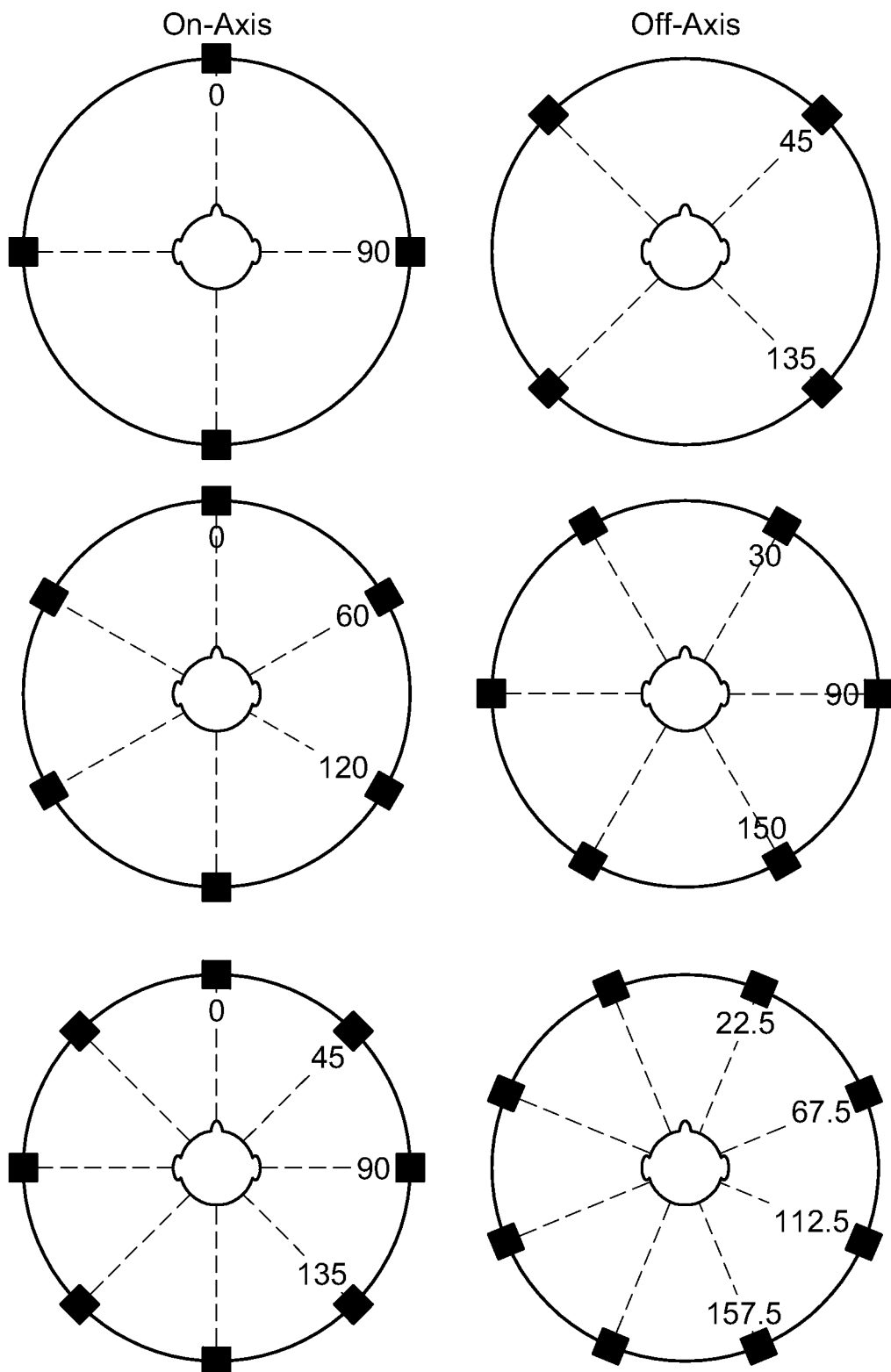
FIG. 6 is a schematic plan view of the possible symmetric virtual loudspeaker configurations for four, six and eight loudspeakers, discussed in respect of the testing of the present application.
Figure 7A:
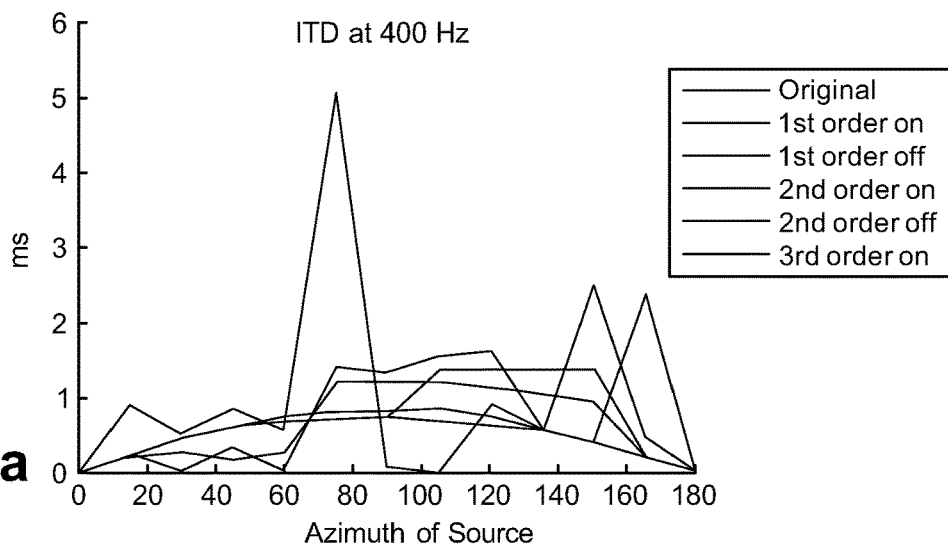
FIGS. 7A, 7B, 7C, 7D, and 7E show graphs illustrating the ITD for various frequencies.
Figure 7B:
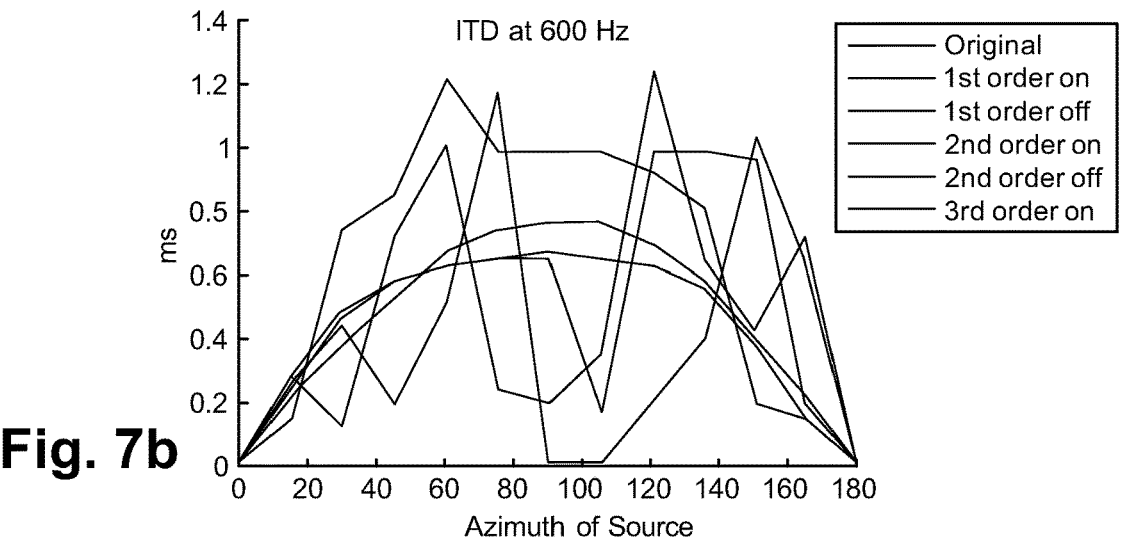
Figure 7C:
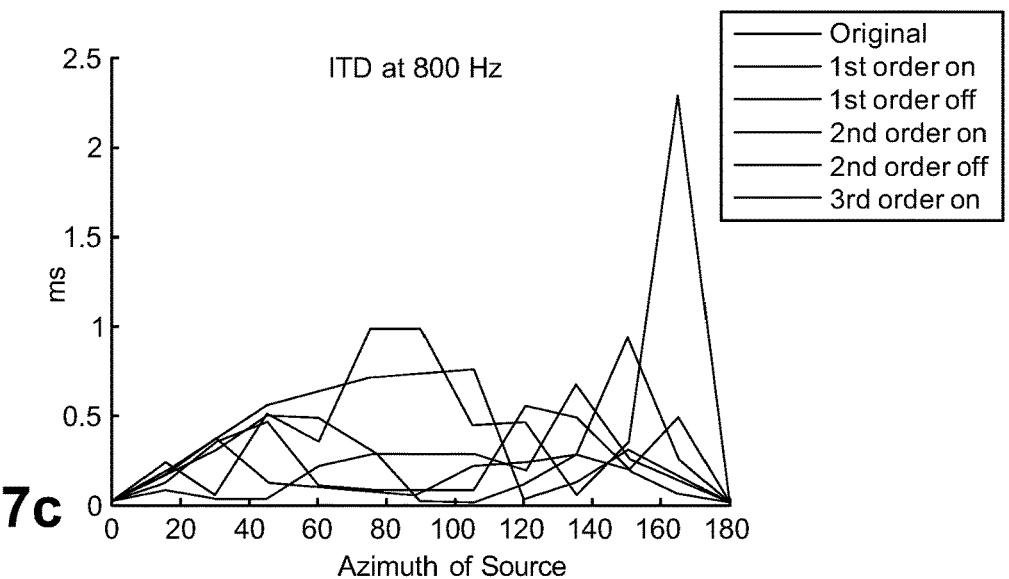
Figure 7D:
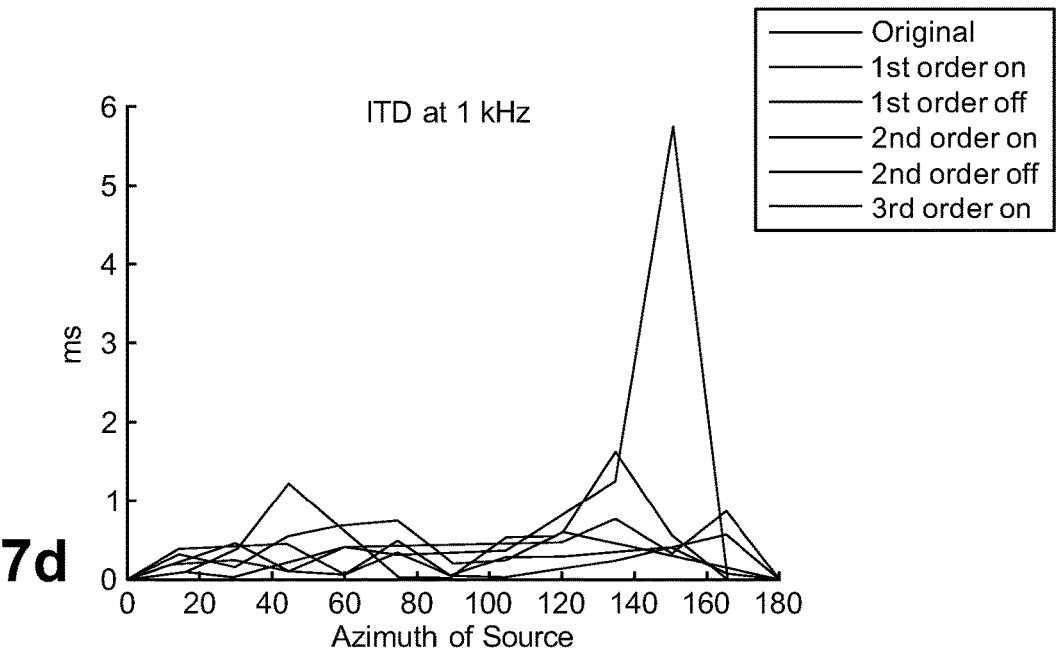
Figure 7E:
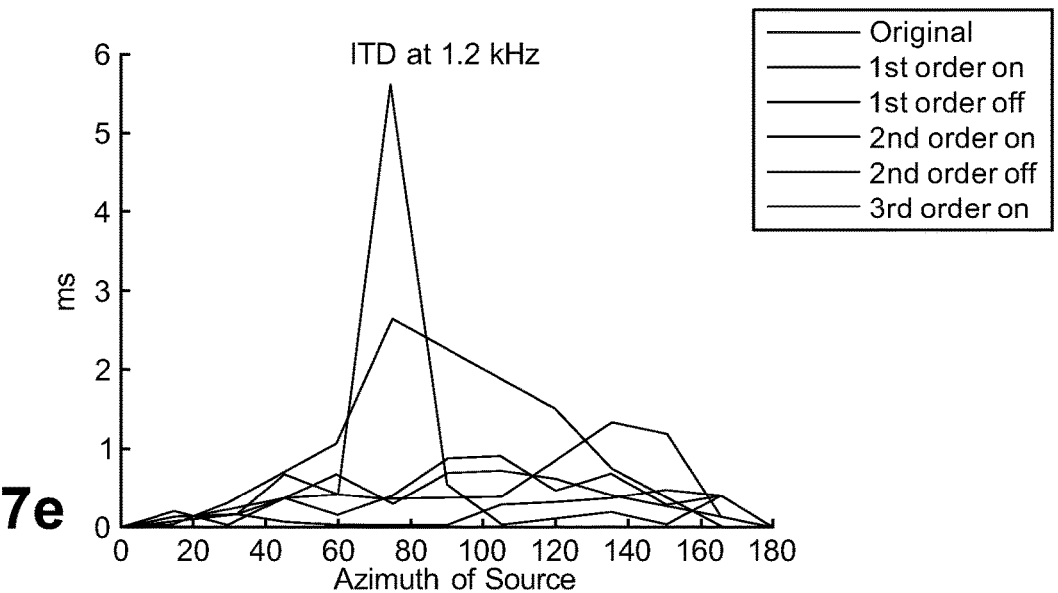

There are two possible configurations for each order, as shown in FIG. 6. On-axis loudspeaker configurations for the first order consist of virtual loudspeakers located directly to the right, left, front and back of the listener. The first order can have loudspeakers in this on axis configuration with both the ears and the nose in the first configuration and neither in a second configuration. The second order can have a pair of loudspeakers that are either on-axis with the ears or on-axis with the nose, that is in an on-axis position the speakers are directly in front and behind the listener and in an off-axis position the speakers are directly to the right and left of the listener. The configuration applied to the third order is shown in the bottom two configurations of FIG. 6. The loudspeakers are placed at 22.5 degree intervals or in 45 degree intervals.

By comparing the synthesized HRTFs to measured HRTFs for each virtual loudspeaker placement, shown in FIG. 6, the error introduced by the decoder was compared. The loudspeaker configurations with the virtual loudspeakers directly in front and behind the listener are referred to as on-axis and those without as off-axis.

Interaural time difference (ITD) is the delay of a signal or portion of a signal, relative to each ear. The delay is frequency dependent and the results of testing are shown in Appendix 1 (FIG. 7A, 7B, 7C, 7D, or 7E). Lateralization cures greatly decrease above 800 Hz and phase differences appear to have no effect above approximately 1.5 kHz. The ITD for signals from the front of the listener is about 5 degrees or about 50 μs, but these values can vary between listeners.

The ITD values were calculated from white noise convolved with the HRTFs and then filtered with ERB filters with center frequencies at 400 Hz, 800 Hz, 1 kHz and 1.2 kHz.

The tests conducted were used to assess whether the multiple highly correlated signals would cause comb filtering. This was assessed by considering the error in dB over frequency for the contralateral ear and the ipsilateral ear for the first to third order HRTF sets.

The testing for the present embodiments also considered the geometric distances, which were used to determine how similar two objects are. The geometric distances were considered here to help reduce the number of dimensions of data that need to be considered, that is, frequency, source azimuth and decoding technique. Each HRTF was considered as a collection of 64 or 512 features, depending on the length of the HRTF. The geometric distance between each HRTF can be calculated when viewing each HRTF as an individual point in 64 or 512-dimensional space. The Euclidean distance of two n-dimensional points P=(p1, p2, . . . , pn) and Q=(q1, q2, . . . , q4) is described below in equation 7:

$$D(P,Q) = \sqrt{(p1-q1)^2+(p2-q2)^2+...+(p_n-p_n)^2}$$  Equation 7

A smaller distance between two points implies that those two points are more similar than points located further away from each other. The closest two points can be is if a point is located with itself. The cosine similarity of two points measures the angle formed by the points instead of the distance between them as shown in Equation 8:

$$\text{Cos}Sim(P, Q) = \frac{P \cdot Q}{\|P\|\|Q\|}$$  Equation 8

Results

Appendix 1 (FIGS. 7A, 7B, 7C, 7D, and 7E) shows the ITD for various frequencies;

Appendix 2 (FIGS. 8A, 8B and 8C) shows the error in dB over frequency for the contralateral ear; Appendix 3 (FIGS.

9A, 9B and 9C) shows the error in dB over frequency for the ipsilateral ear Appendix 4a (FIG. 10A) shows the Euclidean distance for the contralateral and the ipsilateral ears for the on-axis (circles) and off-axis (triangles); and Appendix 4b (FIG. 10B) shows the Euclidean distance for the contralateral and the ipsilateral ears for first (circles), second (triangles) and third (squares) orders.

As shown in Appendix 1 (FIGS. 7A, 7B, 7C, 7D, and 7E), for all HRTF sets the ITD values for the first order decoding are very close to those from the measured HRTFs at 400 Hz and 600 Hz, for both configurations. Below 800 Hz the first order decoding best mimics the cues produced by the measured HRTF set and above 800 Hz the third order best becomes the best at replicating the ITD values. For all frequency bands examined, the second order never performs better than both the first and third orders.

Figure 9A:
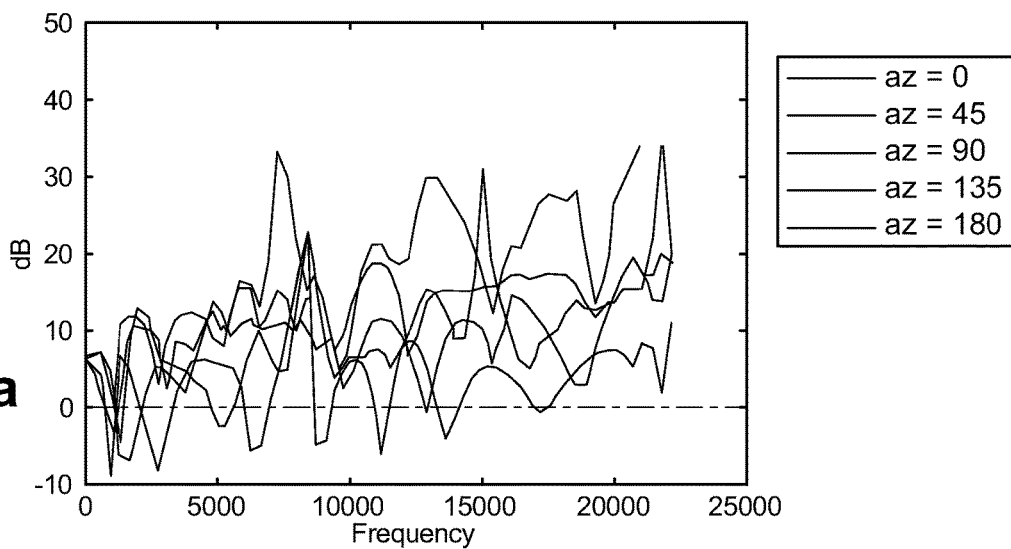
FIGS. 9A, 9B, and 9C show graphs illustrating the error in dB over frequency for the ipsilateral ear.
Figure 9B:
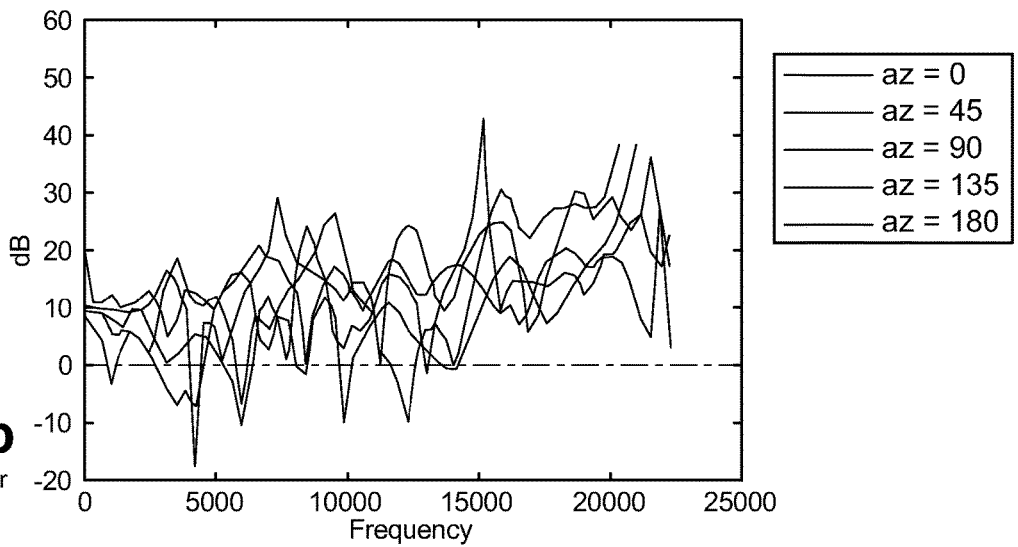
Figure 9C:
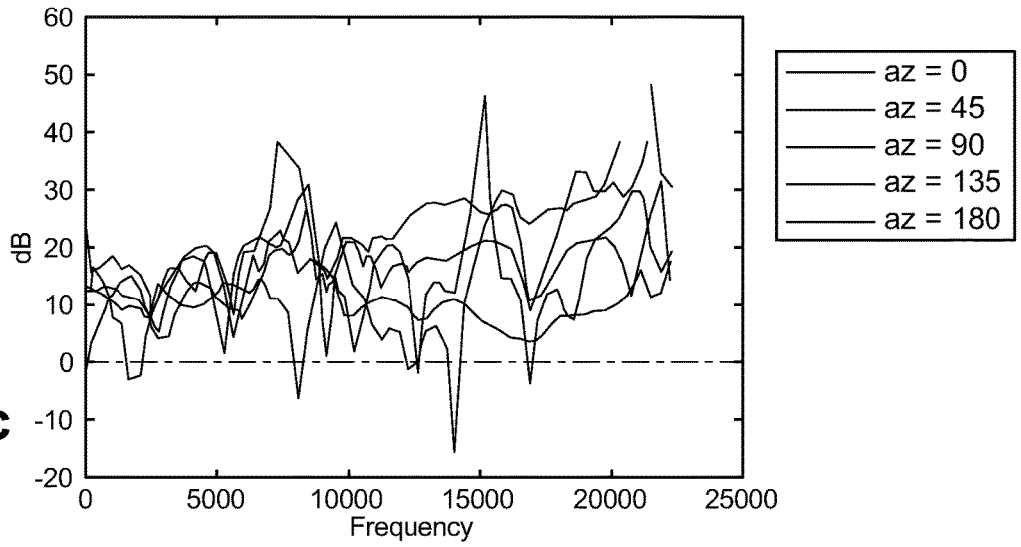

As shown in Appendix 2 (FIGS. 8A, 8B and 8C) and Appendix 3 (FIGS. 9A, 9B and 9C), comb filtering is seen to be caused particularly at first order. The different HRTF sets exhibit varying error but all of the sets show increasing error at the contralateral ear as the order increases, most noticeably at the high and low frequencies. The results shown are for on-axis loudspeaker configurations. It was found that the error for on versus off-axis loudspeaker configurations was not significantly different. However, where a difference was detected, the on-axis configuration was found to have less error. For example, the second order on-axis configurations has error ranging from −10 dB to 20 dB, but the off-axis has error ranging from −10 dB to 30 dB.

Figure 10A:
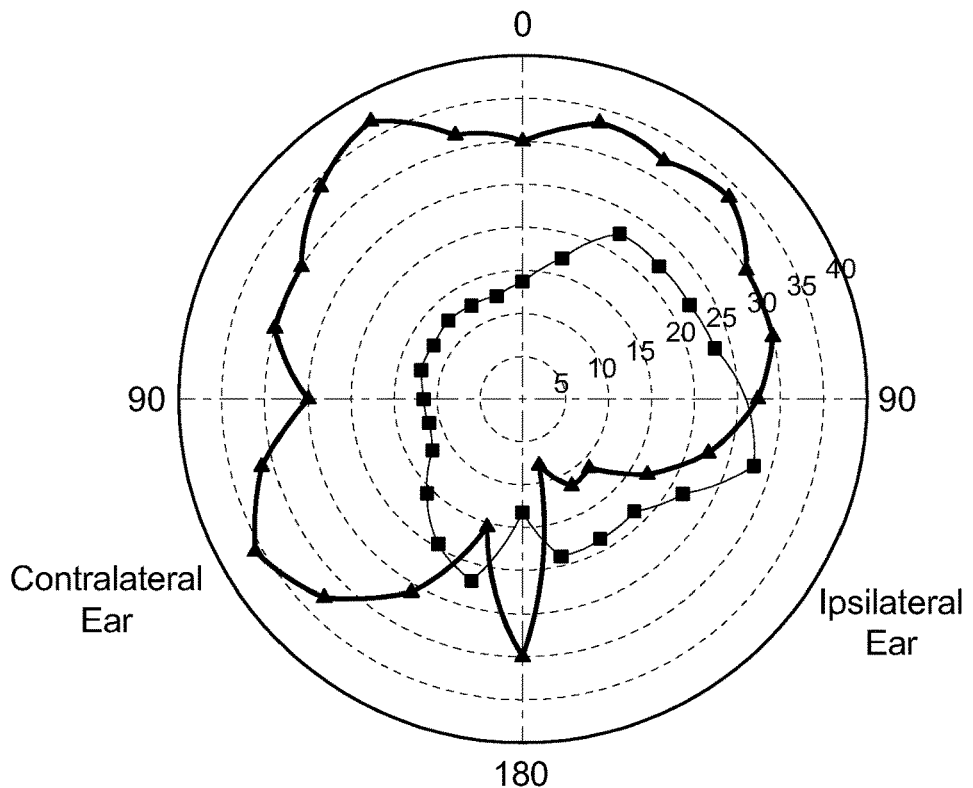
FIG. 10A shows a graph illustrating the Euclidean distance for the contralateral and the ipsilateral ears for the on-axis (circles) and off-axis (triangles)

As shown in Appendix 4 (FIGS. 10A and 10B), the Euclidean distance measurements have similar findings across all of the HRTF sets. For all but the first order, the on-axis configurations produce HRTFs that are closer in Euclidean space to the measured HRTFs than the off-axis configurations for both the ipsilateral and contralateral ears. Appendix 4a—FIG. 10A shows the Euclidean distance for the first order decoding for both on-axis and off-axis configurations. The on-axis configurations (shown with circular markers) are consistently less than the off-axis (shown with triangular markers) for the contralateral ear while the ipsilateral ear has a preference for the on-axis configuration only in the front plane. As it is known that humans localize sounds sources to the front better than to the rear, we consider that the on-axis configuration is closest overall to the measured HRTFs.

Figure 10B:
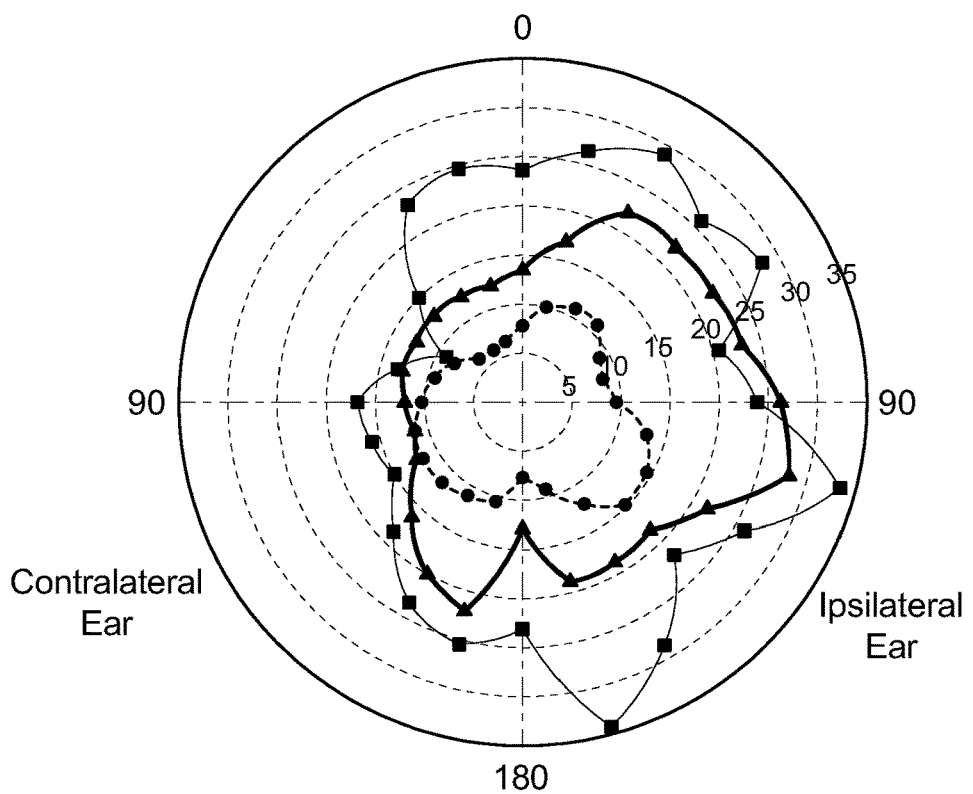
FIG. 10B shows a graph illustrating the Euclidean distance for the contralateral and the ipsilateral ears for first (circles), second (triangles) and third (squares) orders.

All four of the HRTF sets show a considerable increase in Euclidean distance from the measured HRTFs as the order increases, as shown in Appendix 4b—FIG. 10B. This is true for both the contralateral and ipsilateral ears. The ipsilateral ear signals tended to have slightly higher distances than the corresponding contralateral signal.

The cosine similarity testing did not provide as clear an indicator as the Euclidean distance testing. The on-axis configuration is marginally better than the off-axis for both orders, but was found to be highly dependent on the HRTF set. When considering the increasing order with similar loudspeaker configurations, it was found that the second order provides the closest results to the measured HRTFs for the ipsilateral ear, but the first order is consistently better for the contralateral ear.

Conclusions

It was found that there was evidence to suggest that the best configuration for virtual loudspeaker arrangement for the binaural rendering of horizontal-only Ambisonics was an on axis configuration. For all HRTF sets the most accurately synthesized sets were found to be those decoded at first order.

The cosine similarity results and the increased frequency error of the contralateral ear signals confirms that for Ambisonics a signal is constantly fed to all loudspeakers regardless of the location of the virtual source. This is shown in the measured HRTFs when the contralateral ear received the least amount of signal when the sounds source is completely shadowed by the head; this is in contrast to the Ambisonics signal where the contralateral ear will still receive a significant amount of signal.

The ITD measurements taken in these test use a psychoacoustical model to predict what a listener would perceive. ITD values below 800 Hz for first order decoding have excellent results consistently across all HRTF sets, especially for on-axis configurations. Second and third order decoding does not perform as well below 800 Hz. Third order was found to perform well above 800 Hz but not to the same accuracy that is seen in first order decoding at the lower frequency bands. ITD cues become less psychoacoustically important as frequency increases so we conclude that first order decoding may most accurately reproduce psychoacoustic cues.

For first and second order decoding, the on-axis configurations perform better, both in terms of the geometric distances and the frequency error. We have extrapolated that for third axis the on-axis loudspeaker configuration would also be the optimum set-up.

We have also found that the Ambisonics encoding and decoding order does not necessarily increase the spatialization accuracy. First order decoding accurately reproduces the ITD cues of the original HRTFs sets at lower frequencies. Higher order encoding and decoding tend to increase the error at the contralateral ear.

What is claimed is:

1. A method, comprising:
   generating, by a device comprising a processor, audio outputs associated with recordings by decoding channel signals determined using a square root of a head-related transfer function and a number of speakers in a speaker system; and
   activating, by the device, a navigation feature to change a number of the audio outputs concurrently playing around an entity.

2. The method of claim 1, further comprising:
   enabling, by the device, selection of a defined number of concurrently output ones of the audio outputs.

3. The method of claim 1, wherein the navigation feature changes a location of an audio output of the audio outputs relative to the entity.

4. The method of claim 1, further comprising:
   determining, by the device, an online music store associated with an audio output of the audio outputs.

5. The method of claim 1, wherein angular relations between the audio outputs are maintained during navigation using the navigation feature.

6. The method of claim 1, wherein the navigation feature comprises tracking motion of the entity.

7. The method of claim 1, wherein the audio outputs are generated according to a musical preference associated with the entity.

8. The method of claim 1, wherein the device is a mobile device.

9. A system, comprising:
   a processor, configured to execute or facilitate execution of executable components, comprising:
      a generation component configured to generate audio outputs associated with recordings based on channel signals determined using a square root of a head-related transfer function and a number of speakers determined to be present in a speaker system; and a navigation component configured to activate a navigation feature to change a number of the audio outputs concurrently playing in a three-dimensional listening area associated with an entity.

10. The system of claim 9, wherein the navigation component is further configured to store map data representative of one or more similarity maps.

11. The system of claim 9, wherein the navigation component is configured to enable selection of a defined number of the audio outputs.

12. The system of claim 9, wherein the navigation component comprises an accelerometer.

13. The system of claim 9, wherein the navigation component comprises tangible input controls.

14. The system of claim 9, wherein the audio outputs are arranged in an on-axis configuration.

15. The system of claim 9, further comprising a visualization component configured to display the three-dimensional listening area.

16. A non-transitory computer-readable medium having instructions stored thereon, the instructions comprising:

instructions to generate audio outputs associated with recordings by decoding channel signals determined using a square root of a head-related transfer function and a number of speakers in a group of speakers of a sound system; and instructions to activate a zoom feature to modify a number of the audio outputs concurrently playing in a three-dimensional listening area surrounding an entity.

17. The non-transitory computer-readable medium of claim 16, wherein the instructions further comprise:

instructions to arrange the audio outputs according to properties associated with the recordings.

18. The non-transitory computer-readable medium of claim 16, wherein the instructions further comprise:

instructions to move the entity within the three-dimensional listening area, wherein the audio outputs are stationary.

19. The non-transitory computer-readable medium of claim 16, wherein the three-dimensional listening area comprises a type of listening environment, and wherein the instructions further comprise:

instructions to change the type of listening environment.

20. The non-transitory computer-readable medium of claim 19, wherein the type of listening environment comprises a living-room type or a religious venue type.

* * * * *